United States Patent [19]

Waits

[11] 4,243,242
[45] Jan. 6, 1981

[54] EXPANSIBLE BOAT TRAILER

[76] Inventor: Gregory D. Waits, 766 Galt Dr., San Diego, Calif. 92021

[21] Appl. No.: 32,530

[22] Filed: Apr. 24, 1979

[51] Int. Cl.³ .............................................. B60P 3/10
[52] U.S. Cl. .................. 280/414 R; 9/1.2; 280/656
[58] Field of Search .............. 280/414 R, 411 A, 656, 280/42; 296/26, 27; 9/1.2; 414/538

[56] References Cited

U.S. PATENT DOCUMENTS

| 2,639,162 | 5/1953 | Schon | 280/42 |
| 2,886,339 | 5/1959 | Buttles | 280/42 |

FOREIGN PATENT DOCUMENTS

| 668600 | 5/1964 | Italy | 280/414 R |
| 1271780 | 4/1972 | United Kingdom | 280/656 |

*Primary Examiner*—John A. Pekar

[57] ABSTRACT

The invention is a trailer designed for use with catamarans and perhaps other multi-hull vessels which are intended to be trailed on the highway but have a beam when sailing much broader than the permissible widths of vehicles allowed on the highway, so that the hulls are separate and can be collapsed together for trailing, and expanded to the proper width and assembled with frame support members when ready to sail. The trailer is designed to carry this type of vessel and has a pair of elongated cradles mounted on the ends of outrigger beams which are swung outwardly to put the hulls at the proper spacing for attachment for sailing, with the outrigger beams being swung inwardly by a central traveling beam to which they are pivoted to draw the cradles together side by side in transport-ready position on the trailer.

8 Claims, 8 Drawing Figures

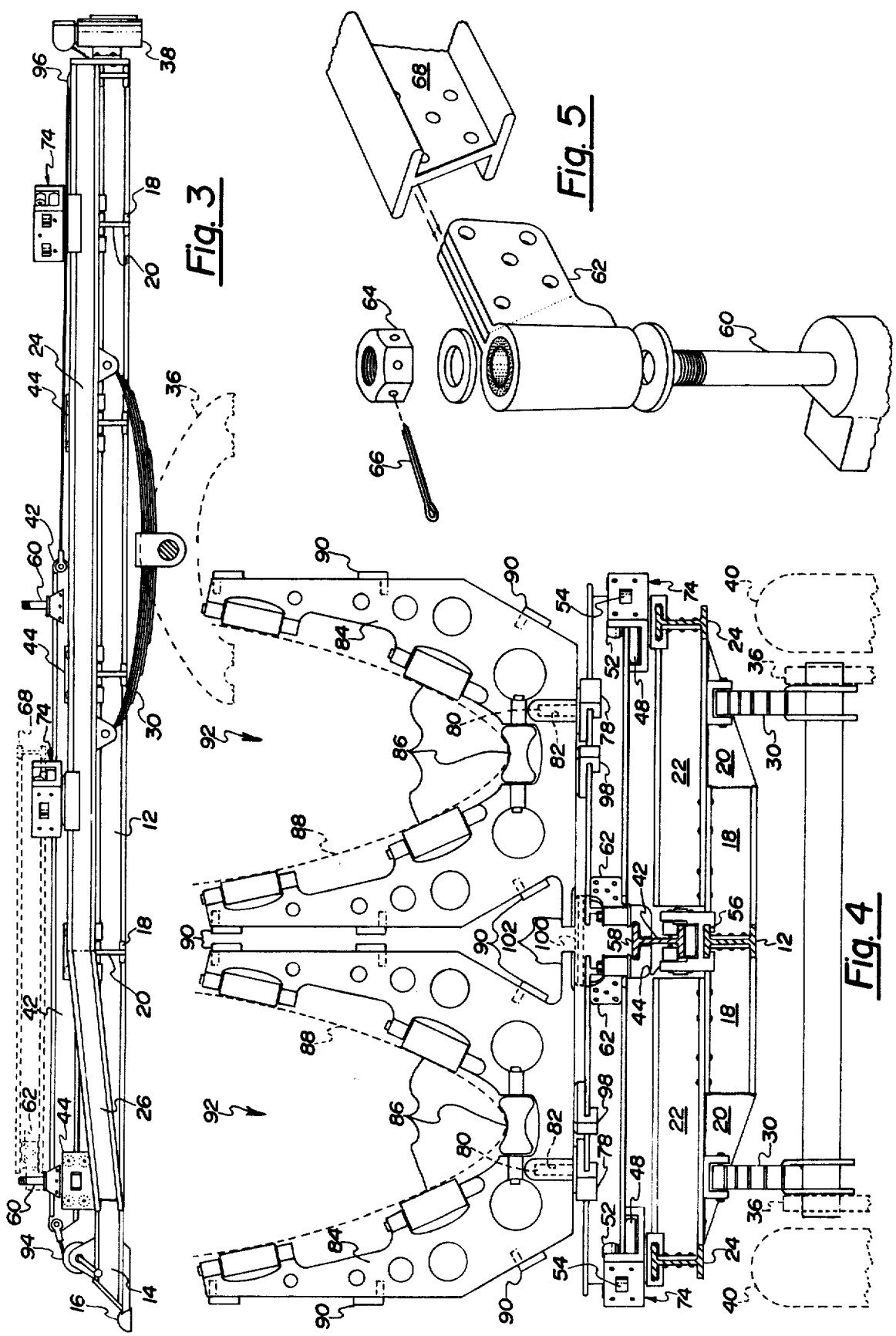

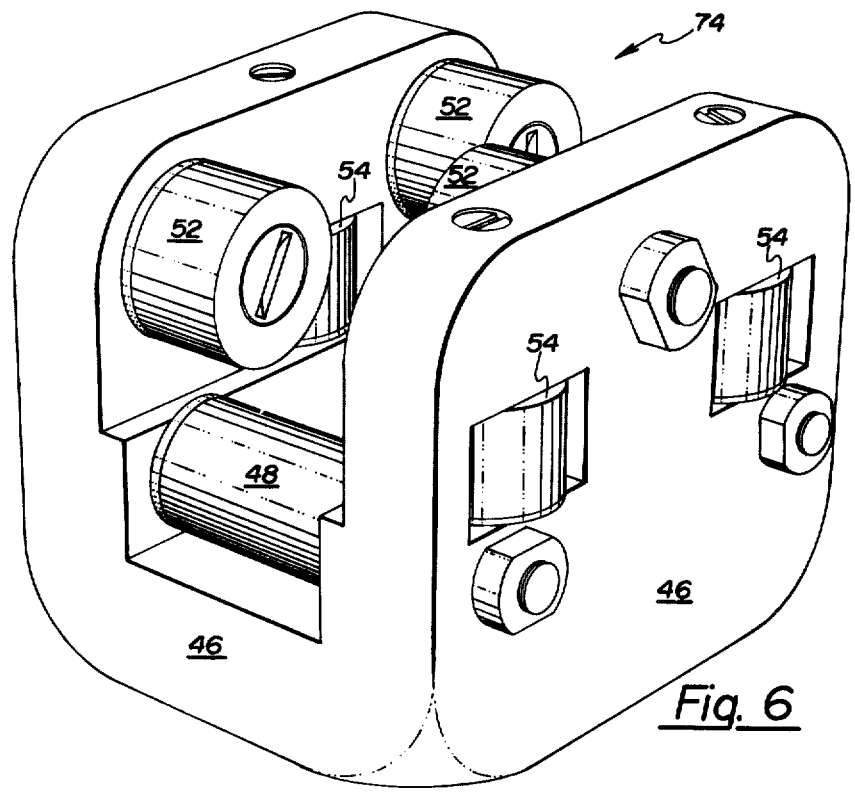
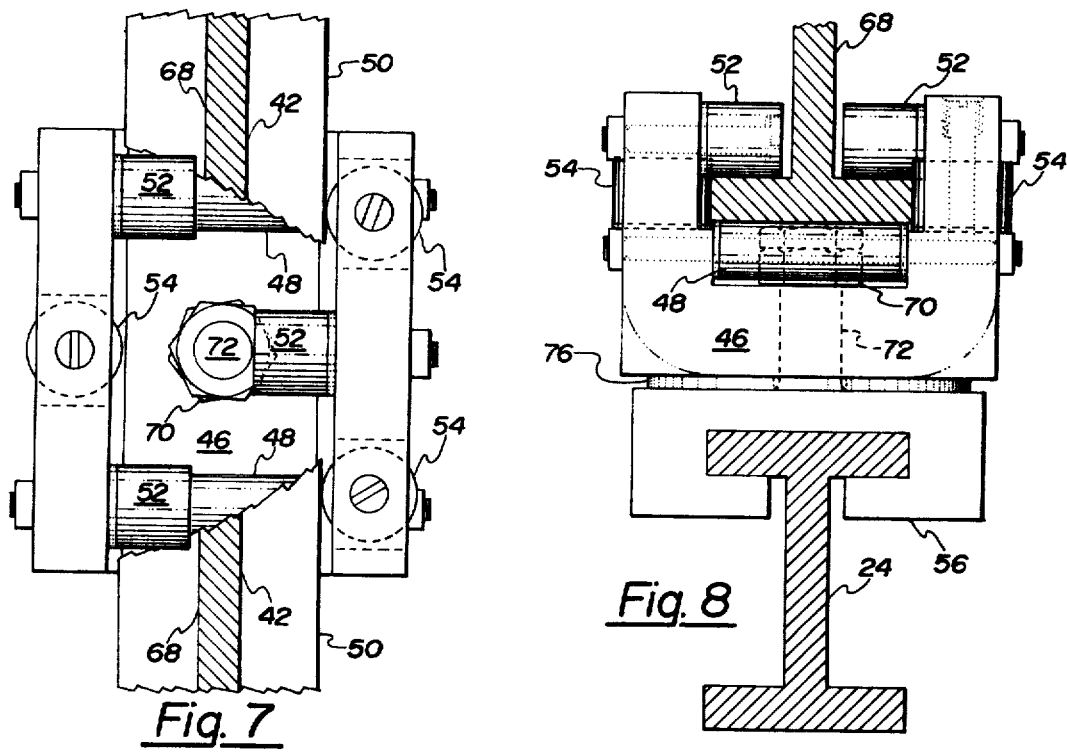

EXPANSIBLE BOAT TRAILER

BACKGROUND OF THE INVENTION

Multi-hull vessels have experienced a tremendous popularity in recent years. In their initial stages of development, these vessels were provided either as large boats which could only be maintained at a slip or dock space in the water, or the much smaller catamaran which could be trailed on the highway. Because of the much wider beam of the catamaran compared to a conventional sailboat, only very small boats of the multi-hull variety could previously be trailed on the highway. As the cost of permanent dock space continues to sharply increase, maintaining a multi-hull vessel at a dock has become prohibitively expensive for many spare time sailors, resulting in the demand for various means to trail middle-sized catamarans so that they would not have to be kept at a dock.

The patent literature is replete with not only different trailer styles, but some rather involved hull designs and overall multi-hull vessel configurations which permit collapsing and towing of these vessels. Another approach, used for catamarans slightly larger than the readily trailable variety, is to elevate one hull reltative to the other on a trailer and tow the vessel at a steep sideways slope.

A solution which involves the present invention directly is a catamaran having a beam of 17 to 20 feet, which is obviously a great deal wider than the 8 foot maximum width permitted on most highways. This vessel has a pair of hulls which are strapped to cylindrical cross beams which maintain the 17 to 20 foot spacing when the vessel is in use sailing. These cross beams are unstrapped and a pair of short beams of the same diameter are substituted to keep the hulls together when they are separated from the main beams and collapsed together side by side for towing on a specially made trailer. This vessel is a wonderful sailer and can be conveniently towed on the highways so that the conflicting criteria of trailability versus wide beam have been eliminated by merging the advantageous characteristics of both types of vessel in a single boat. There remains one large disadvantage to this vessel, however, which the present invention is designed to eliminate. This disadvantage is the very long time, at least two hours for two people, which is required to assemble the boat at the launch site. Although this is caused by a number of factors, one major contributory factor is the requirement that the boat be assembled in its hull-together mode on board the trailer and launched in this barely seaworthy condition, with the hulls being later separated by forcing them apart on the long cross beams once the hulls are afloat. In addition to the likelihood of loss of small parts and other mishaps trying to accomplish this operation afloat, it is easy to understand that while crouched on a narrow hull in a choppy sea the problems of assembling the boat in expanded form are much exaggerated compared to the same operation if it could be performed in the comfort and safety of a land environment.

SUMMARY OF THE INVENTION

The present invention permits the assembly of the above-discussed vessel on the same trailer on which it is towed. This is made possible by an expanding cradle structure which actually will move the hulls while they are on the trailer between an expanded mode properly spaced for assembly for sailing and collapsed mode whereby the hulls are side by side for transport so no structural modification is required after launching.

The expansion of the boat hulls to prepare for launching, and the collapsing of the boat to prepare for transport, can both easily be done by one man by virtue of the convenience provided by this specially designed trailer. The trailer utilizes two or more pairs of sliding outrigger beams pivoted at their inboard end to a central, longitudinally extended and longitudinally movable traveling beam. The outer ends of these outrigger beams support hull-carrying cradles, so that as the traveling beam is moved forward or aft, the cradles will move between the inboard position and the outboard position. It can readily be seen that once the boat has arrived at the launch site, the central traveling beam can be moved so as to expand the hulls into their launch-ready spacing, and in this orientation, the permanent beam structure of the vessel can be assembled on dry land before launching the vessel. When hauling the boat out, the trailer is lowered down the ramp in its expanded position and draws the boat up onto dry land where the boat beam structure is disassembled, and then again by moving the central traveling beam by means of a winch the hulls are brought together in their cradles and secured for transport.

BRIEF DESCRIPTION OF THE DRAWINGS

FIG. 3 is a side elevation view of the trailer shown in the collapsed position with the outrigger beams and cradles removed;

FIG. 4 is a section taken along line 4—4 of FIG. 1;

FIG. 5 is an exploded perspective view of the clevis which pivots the outrigger beams to the traveling beam;

FIG. 6 is a perspective view of a roller block typical of the guides through which the outrigger beams pass;

FIG. 7 is a front elevation view showing in detail the roller tracks in which the traveling beam moves;

FIG. 8 is a top elevation view of the roller track shown in FIG. 7 with certain rollers omitted to show the bottom rollers.

DETAILED DESCRIPTION OF THE PREFERRED EMBODIMENT

Figure 1:
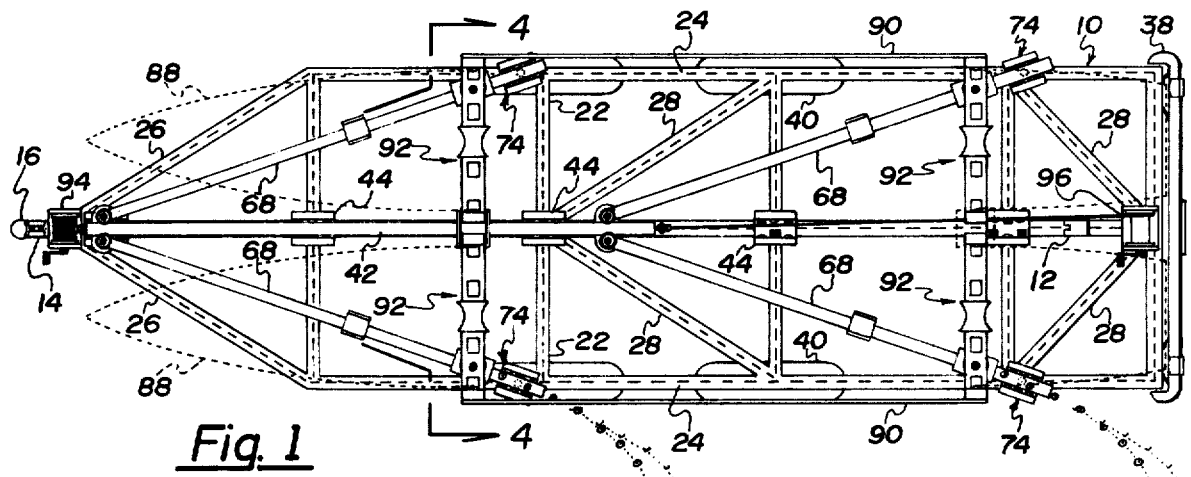
FIG. 1 is a top elevation view of the trailer in its collapsed position.
Figure 2:
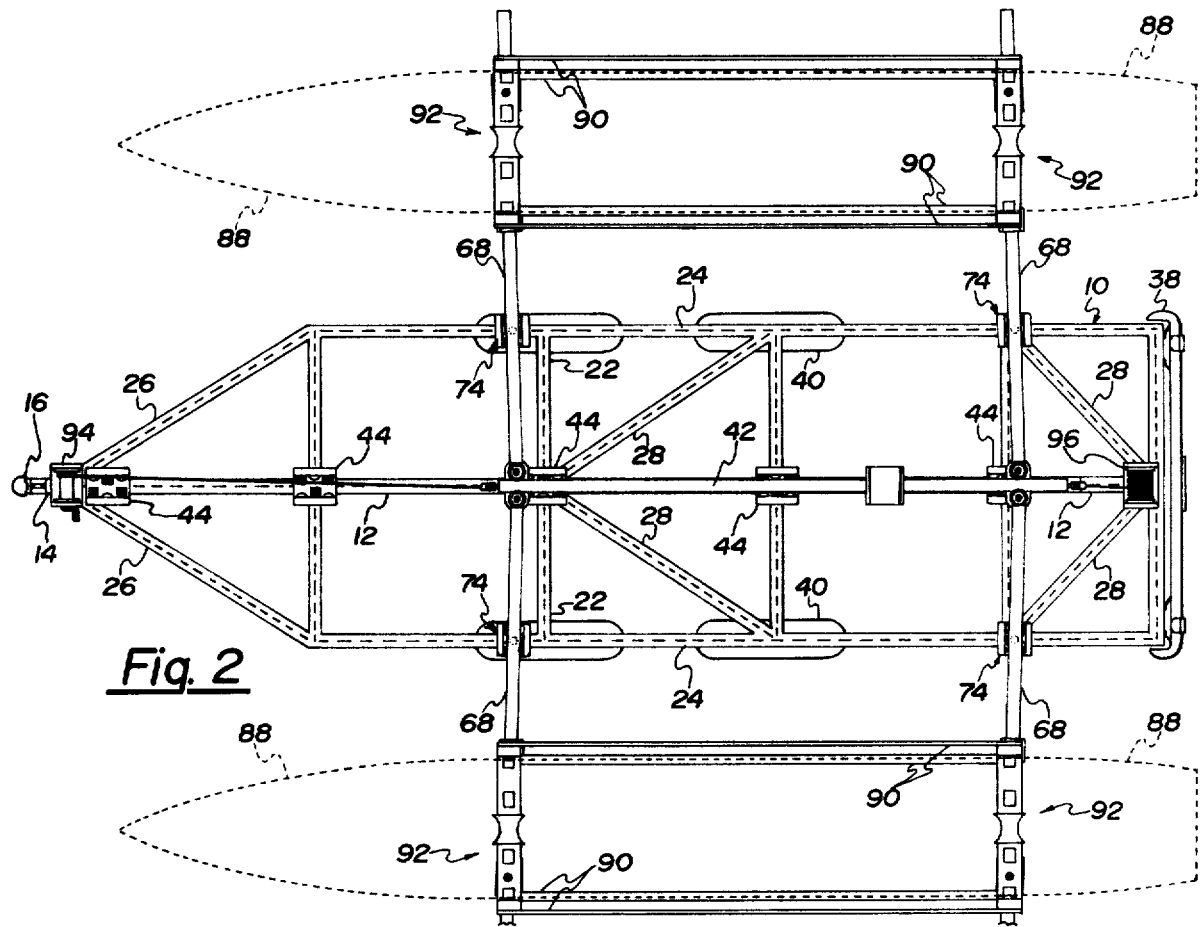
FIG. 2 is a top elevation view identical to FIG. 1 except that the hull cradles are expanded into the launch-ready position.

The trailer as shown in FIGS. 1 and 2 is basically comprised of a static frame which is mounted over the trailer wheels and a moving apparatus mounted atop the static frame which serves to move the hull-carrying cradles laterally in and out between two possible modes. The static frame 10 includes a centerline beam 12 which extends into a neck 14 which mounts the socket 16 of a conventional trailer hitch. The centerline beam 12 has mounted to it at spaced intervals primary transverse beams 18 which terminate in webbed gussets 20 to support overlying secondary transverse beams 22. These last mentioned beams extend out and abut with longitudinal outboard beams 24 which are brought together at their foremost portions by connecting yoke 26 which slopes downwardly toward the front to mate the outboard beams the lower midline beam 12. Triangulation braces 28 may be included in the design, and leaf springs 30 stabilized by crossbar 34 connect to rocking beams 36 which mount the dual axles. The frame also mounts a rear bumper 38.

The frame as thus described is obviously subject to considerable variation in engineering detail, but the embodiment set forth above, constructed principally of I-beams, provides an adequately strong, static frame mounted the wheels 40 and serving as a framework for the attachment of the apparatus described below.

Central to the entire operation of the trailer, both physically and conceptually, is the traveling beam 42 which lies immediately above the static centerline beam 12. Some means is required to permit this traveling beam to move longitudinally relative to the static frame, and as shown this means is a set of roller tracks 44 which are shown as four in number. These roller tracks are also used in another application which will be detailed below, and are illustrated in FIGS. 6 through 8. These tracks each have a U-shaped frame 46 which is made of a heavy steel, and as each track is required to limit the motion of an I-beam therethrough to one dimension, a number of rollers are used in each track. A pair of bottom rollers 48 support the bottom surface of the lower plate 50 of the I-beam and three staggered upper rollers 52 engage the upper surface of the lower plate 50 to prevent the upward escape of the I-beam which will be attempted with considerable force by the traveling beam. Staggered cooperatively with the upper rollers 52 are three vertical axis rollers 54 which center the I-beam by riding on the edges of the lower plate 50. It can thus be seen that once the I-beam is captured in a roller track 44, it can slide through longitudinally but is otherwise immobile.

Turning again to FIG. 4, a roller track 44 is shown having a modified bottom 56 which clamps onto the top of the centerline beam 12. The other three rollers mounting the traveling beam are similarly attached in longitudinal alignment so that the traveling beam is free to move forward and aft along the four restraining tracks.

Again referring to FIG. 4, the upper flange 58 of the I-beam 42 mounts upright pivot pins 60, each of which mounts in journaled relation a clevis 62 retained by a nut 64 secured by a cotter pin 66. The clevis straddles and secures the web of outrigger beam 68 with bolts, welding or other suitable means, this structure being best shown in FIG. 5.

These pivot pin and clevis arrangements are provided in mated pairs as shown in FIG. 4, as are the outrigger beams 68 which they pivotally mount to the central traveling beam 42. FIG. 2 provides a good view of the attachment of the outrigger beams to the central traveling beam. Two pairs of outrigger beams 68 are shown in the drawing, although it is possible and probably desirable to have more than two, and even as many as four or five to support a heavy vessel. Again referring to FIG. 2, each of the outrigger beams 68 is captured by one of the roller tracks 44 which in the case of their relation with the outrigger beams serve as guides 74 which are pivoted to the underlying outboard beams 24. This structure is shown in FIG. 7 wherein the frame 46 of the roller guide is retained by a nut 70 on a stud 72 which is welded to the outboard beam to permit free rotation of the guide 74 supported on a thrust washer 76. The roller structure described above securely but relatively frictionlessly restrains the outrigger beam to longitudinal motion.

Returning again to FIGS. 1 and 2, it can be seen that as the traveling beam 42 proceeds forward or aft, the outrigger beams 68 move outwardly according to the path indicated in FIG. 1. In the collapsed position of FIG. 1, the foremost end of the traveling beam is close to the very front of the trailer and the outboard ends of the outrigger beams are substantially aligned with the static outboard beams 24 and the distance between the outer ends of the outrigger beams is close to the legal maximum width of a vehicle permitted on the highway.

At a point near the ends of each of the outrigger beams 68 is a beam plate clamp 78 which supports an upright axle pin 80 journaled in a bushing seated in a suitable bore shown at 82 in a cradle element 44. Each outrigger beam supports one such cradle element and each cradle element in turn supports a plurality of rollers 86 positioned to accommodate the hull, indicated in phantom at 88, of the vessel which the trailer will carry. The cradle elements for each individual hull are longitudinally aligned and maintained parallel and spaced by longitudinal spars or struts 90 to define complete cradle assemblies 92.

It can now be readily imagined by viewing FIGS. 1 and 2 that the entire cradle assemblies 92, each comprising the component cradle elements 84 with their pivotal attachments to the outrigger beams and the longitudinal spars 90, can be moved from a retracted position indicated in FIG. 1 to an expanded position indicated in FIG. 2 by moving the traveling beam 42 aft to the position of FIG. 2. As can be seen in FIG. 2, the ends of the outrigger beams protrude slightly beyond the edges of the cradle assemblies, and it is for the purpose of minimizing this overlap that the axle pins 80 are slightly outboard of the center of each of the respective cradle elements 84. These pins could of course be positioned otherwise relative to the center of the cradle elements with the commensurate gain or loss in the flushness of the outrigger beam ends with the cradle assemblies when in the expanded position of FIG. 2.

Numerous means of moving the traveling beam forward and aft are of course conceivable, but the simplest and probably the most economical in manufacture is represented in the drawings by a forward windlass 94 and a rear windlass 96. Of course a single windlass with a looped cable could be used to achieve bi-directional movement as could a rack and pinion arrangement.

Out of respect for economy of weight the minimum strength required to make the trailer functional would be provided. Inasmuch as the period of minimum stress on the outrigger beam 68 as well as the remaining structure would occur during the shifting between the modes shown in FIGS. 1 and 2 because there would be no highway jostling or jolts from hull alignment when loading the vessel onto the trailer or of, minimum beam strength can be provided if some reinforcements are incorporated into the design at the two extreme modes of use shown in FIGS. 1 and 2. This is accomplished in part by the utilization of outrigger beam pads 98 best seen in FIG. 4 which compensate for the eccentric pivoting of the cradle asemblies 92 by supporting the cradles beneath the center of gravity or even closer in when the cradle assemblies are in their completely expanded mode. This occurs because at that position the cradle elements 84 are each parallel to and immediately above their respective outrigger beams so that they will slide over the chamfered-edged pads 98 to be supported during the launching and hauling out operations.

A similar chamfered inboard support cradle is mounted on a supporting pedestal atop the traveling beam so that mating inboard arms 100 and 102 would slide over the edges of the pad to provide support for the weight of the hulls in the cradle assemblies during the critical time when the hulls will be transported and in need of the maximum support provided by the trailer.

It can be seen from the drawings of FIG. 4 that the static and moving frame structure of the trailer is disposed immediately above the trailer wheels. This configuration results in the allowance of the maximum legally permissible width of the collapsed double-hull structure with their supporting cradles. For this reason it is unlikely that it would be possible to lower the overstructure of the trailer to a position between the wheels to obtain a lower profile. However, it may be possible to do this with the outboard beams 24, although an obvious sacrifice in moment arm will be made because the high moment arm provided the heavy hulls in their expanded position will produce greater strength demands on the outrigger beams, the static outboard beams 24, the traveling beam, the centerline beam 12, and all the structure holding these beams together.

By putting the entire mechanism above the wheels, the trade-off is of course a high profile of the trailer and a possible increase in the difficulty of manuevering the trailer in the water beneath the boat during launching and hauling out.

It is the design of the instant invention to provide a road-worthy trailer which is capable of effecting, by a single motion of a single operator, the expansion of a pair of catamaran hulls into launching position, and the collapsing of the same hulls into a configuration sufficiently narrow to permit the trailing of the boat on the streets and highways of the country. Obvious modifications of design are possible within the overall goals herein set forth, and any such modifications would fall within the scope of this description and the appended claims below.

I claim:

1. A trailer for carrying a vessel having two movable hulls which move from an expanded spaced mode for sailing to a collapsed mode for transport, said trailer comprising:
   (a) a rigid vessel support frame mounted on wheels;
   (b) a plurality of loadbeam guide pairs longitudinally spaced along and mounted to said frame with the individual guides of each pair being laterally spaced on opposite sides of the longitudinal and centerline of said frame;
   (c) a longitudinally extended traveling beam disposed along the centerline of said frame and being mounted to said frame for longitudinal movement;
   (d) a plurality of outrigger load beam pairs each comprising a left and right beam and being slidably engaged in said guides and pivoted by their inboard ends at longitudinally spaced positions to said traveling beam;
   (e) left and right hull cradle assemblies pivoted respectively to the outer ends of said left and right outrigger beams, whereby a pair of vessel hulls carried in said cradle assemblies can be selectively moved between said expanded mode and said collapsed mode by longitudinal movement of said traveling beam.

2. Structure according to claim 1 wherein said frame includes a centerline beam and a pair of longitudinal outboard beams disposed parallel to and on opposite sides of said centerline beam, and said guides are mounted on said outboard beams and said traveling beam is mounted to said centerline beam.

3. Structure according to claim 2 wherein said traveling and outrigger beams are I-beams, said traveling beam is mounted to said centerline beam by virtue of a plurality of roller clusters engaging the bottom plate of said traveling beam and said guides comprise roller tracks engaging the bottom plates of said outrigger beams.

4. Structure according to claim 2 wherein said cradle assembles each comprise a plurality of laterally extended longitudinally aligned cradle elements connected together by a plurality of longitudinal stringers, and each of said cradle elements is pivoted about a vertical axis at a point on the respective cradle element outboard of the center thereof.

5. Structure according to claim 4 wherein said centerline beam has a pair of support pads mounted thereon for every pair of said cradle elements and and said pads are aligned to support said cradle assemblies when said cradle assemblies are in their collapsed mode.

6. Structure according to claim 4 wherein each of said cradle elements is aligned with the outrigger beam to which it is mounted when said cradle assemblies are in their expanded position, and each of said outrigger beams has a support pad mounted thereon to support the inboard end of the cradle element mounted thereto.

7. Structure accoridng to claim 6 including a pair of winches mounted on opposite ends of said centerline beam having cables connected to said traveling beam to effect bidirectional movement of same.

8. Structure according to claim 1 wherein said frame includes a longitudinal midline beam and said traveling beam is an I-beam slidably engaged by its bottom plate on said midline beam and said outrigger beams are pivoted to the upper plate of said I-beam.

* * * * *